United States Patent
Oggier

(10) Patent No.: US 9,435,891 B2
(45) Date of Patent: Sep. 6, 2016

(54) TIME OF FLIGHT CAMERA WITH STRIPE ILLUMINATION

(71) Applicant: MESA Imaging AG, Zurich (CH)

(72) Inventor: Thierry Oggier, Zurich (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 13/767,953

(22) Filed: Feb. 15, 2013

(65) Prior Publication Data

US 2014/0055771 A1 Feb. 27, 2014

Related U.S. Application Data

(60) Provisional application No. 61/599,252, filed on Feb. 15, 2012.

(51) Int. Cl.
*G01C 3/08* (2006.01)
*G01S 17/89* (2006.01)

(52) U.S. Cl.
CPC .................................. *G01S 17/89* (2013.01)

(58) Field of Classification Search
CPC ........ G01S 17/10; G01S 7/497; G01S 17/89; G01S 7/487; G01C 3/08
USPC ................ 356/3.01, 4.01, 5.01, 5.09, 9, 625
See application file for complete search history.

(56) References Cited

U.S. PATENT DOCUMENTS

| 5,278,423 A | 1/1994 | Wangler et al. | |
|---|---|---|---|
| 5,870,180 A * | 2/1999 | Wangler | 356/4.01 |
| 6,266,068 B1 * | 7/2001 | Kang | G06T 11/60 345/422 |
| 8,052,305 B2 * | 11/2011 | Hsiao | 362/253 |
| 8,400,511 B2 * | 3/2013 | Wood et al. | 348/164 |
| 8,587,583 B2 * | 11/2013 | Newcombe | G06T 17/00 345/420 |
| 2002/0071122 A1 * | 6/2002 | Kulp | G01M 3/38 356/437 |
| 2003/0235344 A1 * | 12/2003 | Kang | G06K 9/32 382/284 |

(Continued)

FOREIGN PATENT DOCUMENTS

WO 02/082201 A1 10/2002

OTHER PUBLICATIONS

Fuchs, "Multipath Interference Compensation in Time-of-Flight Camera Images," German Aerospace Center, Germany, International Conference on Pattern Recognition, IEEE, 2010, pp. 3583-3586.

(Continued)

*Primary Examiner* — Luke Ratcliffe
*Assistant Examiner* — Samantha K Abraham
(74) *Attorney, Agent, or Firm* — Fish & Richardson P.C.

(57) ABSTRACT

A time of flight (TOF) based camera system includes an illumination module that illuminates only portion of the sensor's field of view that translates to a given region of the pixels of the imaging sensor. The acquired data of the pixel region is processed and/or readout, typically. After the exposure time of the first pixel region is completed, a second pixel region is illuminated and the second pixel region is processed. This procedure can be repeated a couple of times up to a few hundred even thousand times until the entire pixel array is readout and possibly read-out a number of times. The full depth image is then reconstructed based on the results from the different pixel region acquisitions. This system can be used to reduce stray light. Compared to state-of-the-art TOF camera, the presented method and device show improvements in background light stability and a reduction in multiple reflections.

23 Claims, 5 Drawing Sheets

(56) References Cited

U.S. PATENT DOCUMENTS

| | | | |
|---|---|---|---|
| 2004/0056966 A1* | 3/2004 | Schechner | G06T 7/0018 348/229.1 |
| 2004/0057049 A1* | 3/2004 | Bruch et al. | 356/328 |
| 2004/0213463 A1* | 10/2004 | Morrison | G01B 11/25 382/210 |
| 2005/0020926 A1* | 1/2005 | Wiklof | A61B 1/00193 600/476 |
| 2006/0087628 A1* | 4/2006 | Dvorkis | G03B 35/18 353/121 |
| 2006/0202036 A1* | 9/2006 | Wang | G06K 7/10722 235/462.07 |
| 2006/0202038 A1* | 9/2006 | Wang | G06K 7/10732 235/462.24 |
| 2007/0091183 A1* | 4/2007 | Bendall | H04N 5/232 348/211.99 |
| 2007/0177841 A1* | 8/2007 | Danziger | G01S 17/89 385/28 |
| 2008/0165267 A1* | 7/2008 | Cok | H04N 7/144 348/333.01 |
| 2010/0208244 A1* | 8/2010 | Earhart et al. | 356/139.01 |
| 2011/0025843 A1 | 2/2011 | Oggier et al. | |
| 2011/0043661 A1* | 2/2011 | Podoleanu | A61B 3/102 348/239 |
| 2011/0074983 A1* | 3/2011 | Bush | G03B 39/06 348/241 |
| 2011/0090485 A1* | 4/2011 | Cronin | G07D 7/122 356/71 |
| 2011/0115897 A1* | 5/2011 | Najmabadi | G01N 21/6458 348/79 |
| 2011/0284625 A1* | 11/2011 | Smith | G06K 7/1098 235/375 |
| 2012/0013887 A1* | 1/2012 | Xu et al. | 356/4.02 |
| 2012/0019809 A1* | 1/2012 | Shirley | G01B 11/2441 356/51 |
| 2012/0033045 A1 | 2/2012 | Schweizer et al. | |
| 2012/0195471 A1* | 8/2012 | Newcombe | G06T 7/2006 382/106 |

OTHER PUBLICATIONS

Godbaz, et al., "Multiple Return Separation for a Full-Field Ranger Via Continuous Waveform Modelling," Department of Engineering, University of Waikato, Hamilton, New Zealand, Proc. SPIE 7251, 2009, pp. 72510T-1 to 72510T-12.

Oggier, Thierry, et al., "An all-solid-state-optical range camera for 3D real-time imaging with sub-centimeter depth resolution (SwissRanger™)", Proc. of the SPIE, vol. 5249, 2004, pp. 534-545.

Oggier, et al., "3D TOF Camera with Masked Illumination," U.S. Appl. No. 13/196,291, filed Aug. 2, 2011, pp. 1-25.

International Search Report and Written Opinion of the International Searching Authority mailed on May 16, 2013 from counterpart International Application No. PCT/IB2013/000182, filed on Feb. 13, 2013.

International Preliminary Report on Patentability, mailed on Aug. 28, 2014 from counterpart International Application No. PCT/IB2013/000182, filed on Feb. 13, 2013.

* cited by examiner

TIME OF FLIGHT CAMERA WITH STRIPE ILLUMINATION

RELATED APPLICATIONS

This application claims the benefit under 35 U.S.C. §119 (e) of U.S. Provisional Application No. 61/599,252, filed on Feb. 15, 2012, which is incorporated herein by reference in its entirety.

BACKGROUND OF THE INVENTION

Three dimensional (3D) time-of-flight (TOF) cameras are active optical depth measurement systems. In general, TOF systems are based on the phase-measurement technique of emitted intensity-modulated light, which is reflected by the scene. The reflected light is imaged onto a sensor. The photo-generated electrons are demodulated in the sensor. Based on the phase information, the distance for each pixel is deduced. A more detailed description is presented by Oggier, et al. in "An all-solid-state optical range camera for 3D real-time imaging with sub-centimeter depth resolution (SwissRanger)", Proc. Of the SPIE, Vol. 5249, pp. 534-545, 2004.

All TOF cameras include an illumination module, an imaging sensor and some optics. The illumination module is designed such as to illuminate the scene so as to enable its capture as uniformly as possible, or adjust the illumination based on the scene of interest.

All existing full field TOF cameras illuminate the pixels of interest simultaneously with an illumination module that comprises either an array of light emitting diodes (LEDs) or laser diodes. The illumination module is designed with the intention to keep the required dynamic range of the sensor as small as possible, often leading to adjustments that result in the reflection of the same amount of light back to the camera from all objects within the field of interest. In general purpose 3D TOF cameras, the illumination is built to illuminate the field-of-view as uniformly as possible.

Optimal illumination beam shaping for TOF cameras are presented by Oggier et al. in "Time of Flight Camera with Rectangular Field of Illumination", U.S. Pat. Appl. Publ. No. US 2011/0025843 A1. Further improvements can be achieved using masked illumination as suggested by Oggier et al. in "3D TOF camera with masked illumination", U.S. patent application Ser. No. 13/196,291, filed on Aug. 2, 2011. Other approaches using diffractive optical elements or other refractive devices are possible to improve the illumination.

SUMMARY OF THE INVENTION

The present invention concerns a TOF based camera system with an illumination module that illuminates only a given region of the field of view of the imaging sensor. This translates to a region of the pixels of the imaging sensor. The acquired data of the pixel region is processed and/or readout, typically. After the exposure time of the first pixel region is completed, a second pixel region is illuminated and the second pixel region is processed. This procedure can be repeated a couple of times up to a few hundred even thousand times until the entire pixel array is readout and possibly readout a number of times. The full depth image is then reconstructed based on the results from the different pixel region acquisitions.

The different pixel regions are preferably one or several lines or columns of pixels. The illumination generated by the illumination module therefore has preferably a vertical or horizontal stripe-shape characteristics, although other shapes such as squares or rectangles are possible. The different regions are preferably adjacent to each other, but might also overlap each other. In any case, the pixel regions or portions of the field of view that are illuminated are preferably a small part of the total pixels/total field of view of the sensor, such as 10% or less. The results of the different pixel regions are combined to build together the full 3D depth map of the entire scene captured by the entire pixel field of the imaging sensor.

The pixels on the image sensor are preferably reset after each pixel region acquisition.

Illuminating and measuring pixel region by pixel region independently has advantages with respect to multiple reflections (multi-path) since the pixel region receives more direct light while indirect paths or any multiple reflections are reduced.

Furthermore, a pixel region measurement is shorter in time than a full field measurement. This is due to shorter readout and acquisition time. For this reason, the so-called motion artifacts are reduced compared with conventional cameras.

Furthermore, projecting the available light power to a region of pixels instead to the full field improves the signal to background light ratio for the illuminated pixel region.

In general, according to one aspect, the invention features a time of flight camera comprising an imaging sensor that demodulates received light from a field of view of a scene and an illumination module for illuminating portions of the field of view of the scene with modulated light.

In embodiments, the illuminated portions are scanned over the field of view, preferably sequentially. The imaging sensor reads out pixels that correspond to the illuminated portions of the field of view. Typically the illuminated portions are horizontal stripes that are successively scanned over the entire field of view.

In one example, the illumination module comprises a light source and a scanning device for scanning the light from the light source over the field of view. The scanning of the scanning device is synchronized to the acquisition by the imaging sensor.

In general, according to one aspect, the invention features a method of operation for a time of flight camera. The method comprises demodulating received light from a field of view of a scene and illuminating portions of the field of view of the scene with the modulated light.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
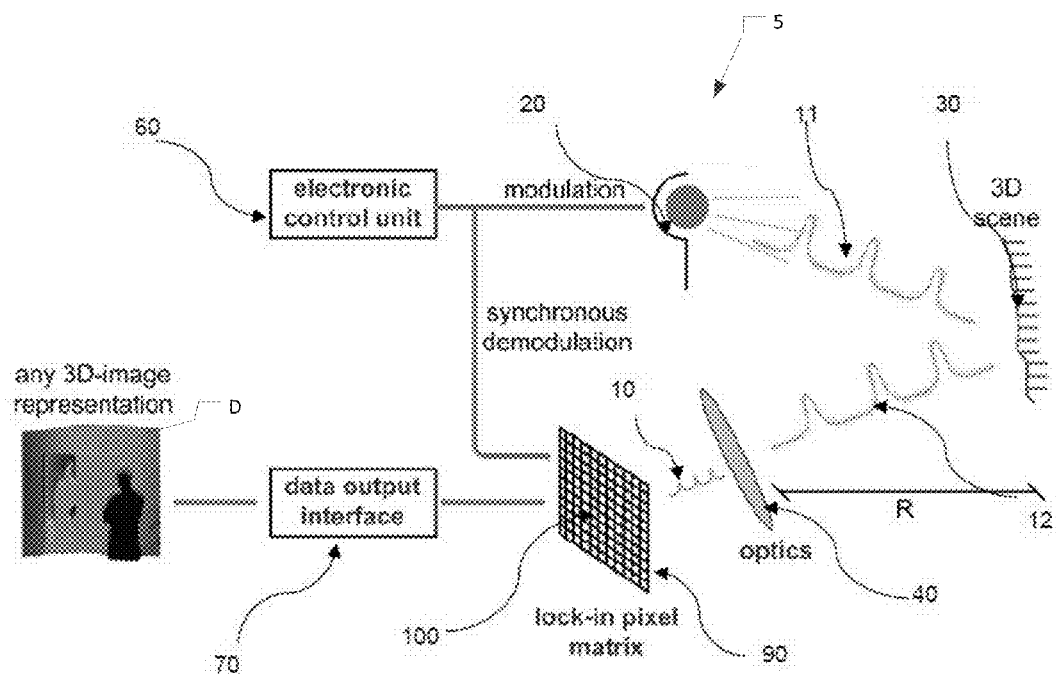
FIG. 1 schematically illustrates a TOF camera system.

FIG. 1 illustrates the operation of a TOF camera system 5.

Modulated emitted illumination light 11 from an illumination module 20 is sent to the object 30 of a scene. A fraction of the total optical power sent out is reflected 12 back to the camera 5, through optics 40 and detected by the 3D imaging sensor 90. The sensor 90 comprises a two dimensional pixel matrix of the demodulation pixels 100. Each pixel 100 is capable of demodulating the impinging light signal 10 that is collected by the lens 40 and imaged on the imaging sensor 90. An electronics control unit 60 controls the timing of the illumination module 20 and sensor 90 to enable its synchronous detection.

The demodulation values allow for each pixel to compute the time-of-flight, which, in turn, directly corresponds to the distance information R of the corresponding point in the scene 30. The two-dimension gray scale image with the distance information is converted into a three-dimensional image at the data output interface 70 that comprises image processor for example. This can be displayed to a user via display D or used as a machine vision input.

The distance R for each pixel is calculated by $$R=(c*TOF)/2,$$

with c as light velocity and TOF corresponding to the time-of-flight.

The time-of-flight TOF is obtained by demodulating the light signal 11 that is reflected from the scene 30 and impinges on each pixel 100 of the sensor 90. Different modulation schemes are known, for example pseudo-noise modulation, pulse modulation or continuous modulation. The latter technique is used in the following, without restricting the invention to this particular modulation scheme, in order to explain the invention in more detail.

The parallel demodulation of the optical signal by all pixels at the same time enables the delivery of 3D images in real-time, i.e., frame rates of up to 30 Hertz (Hz), or even more, are possible. If continuous sine modulation is used, the phase delay P between the emitted signal and the received signal is corresponding directly to the distance R:

$$R=(P*c)/(4*pi*f \text{ mod}),$$

where fmod is the modulation frequency of the optical signal. Typical state-of-the-art modulation frequencies range from a few MHz up to a few hundreds of MHz or even GHz.

Figure 2A:
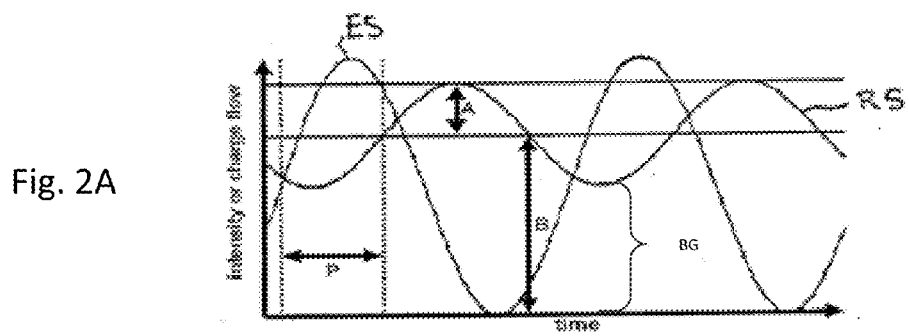
FIGS. 2A and 2B are plots, as a function of time, of the emitted signal or illumination light ES and received signal or light impinging on the imaging sensor RS and the demodulation of the received signal RS.

FIGS. 2A and B show examples for the emitted and reflected optical signals when continuous sinusoidal modulation is applied, and for the sampling process of the detected signal, respectively.

FIG. 2A shows both the modulated emitted illumination signal ES 11 and received impinging signal RS 10. The amplitude A, offset B of the received signal RS and phase P between both signals are unknown, but they can be unambiguously reconstructed with at least three samples of the received signal. BG represents the received signal part due to background light.

Figure 2B:
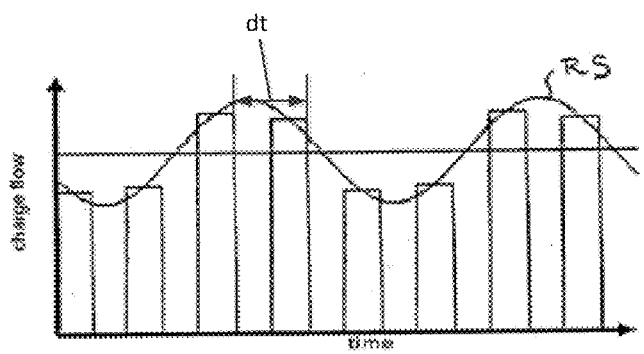

In FIG. 2B, a sampling with four samples per modulation period is depicted. Each sample is an integration of the electrical photo-signal over a duration dt that is a predefined fraction of the modulation period. Typically, in demodulation pixels with 4 integration nodes, dt corresponds to a quarter of the period. In order to increase the signal to noise ratio of each sample, the photo-generated charges may be accumulated over several—up to more than 1 million— modulation periods in the integration nodes.

The electronic control unit 60, employing for example a field programmable gate array (FPGA), generates the required signals for the synchronous channel activation in the demodulation stage of each pixel.

Using four samples, the three decisive modulation parameters amplitude A, offset B and phase shift P of the modulation signal can be extracted by the equations $$A=\text{sqrt}[(A3-A1)^2+(A2-A0)^2]/2$$

$$B=[A0+A1+A2+A3]/4$$

$$P=\arctan[(A3-A1)/(A0-A2)]$$

where A0, A1, A2, A3 are the samples.

The parallel illumination and acquisition of the entire field of view results in a very high frame rate in TOF cameras.

On the other side, parallel acquisition also renders the challenge of compensating for multiple reflections in the scene. The occurrence of multiple reflections in the scene and possible corrections are proposed by Godbaz et al. in "Multiple Return Separation for a Full-Field Ranger Via Continuous Waveform Modelling", Department of Engineering, University of Waikato, Hamilton, New Zealand, Proc. SPIE 7251. Another approach for correcting multiple reflections is presented by Fuchs in "Multipath Interference Compensation in Time-of-Flight Camera Images", German Aerospace Center, Germany, International Conference on Pattern recognition, IEEE, 2010.

A modulation-based approach is presented by Schweizer et al. in "Multi-Path Compensation Using Multiple Modulation Frequencies in Time of Flight Sensor", U.S. Pat. Appl. Publ. No. US 2012/0033045 A1.

Figure 3A:
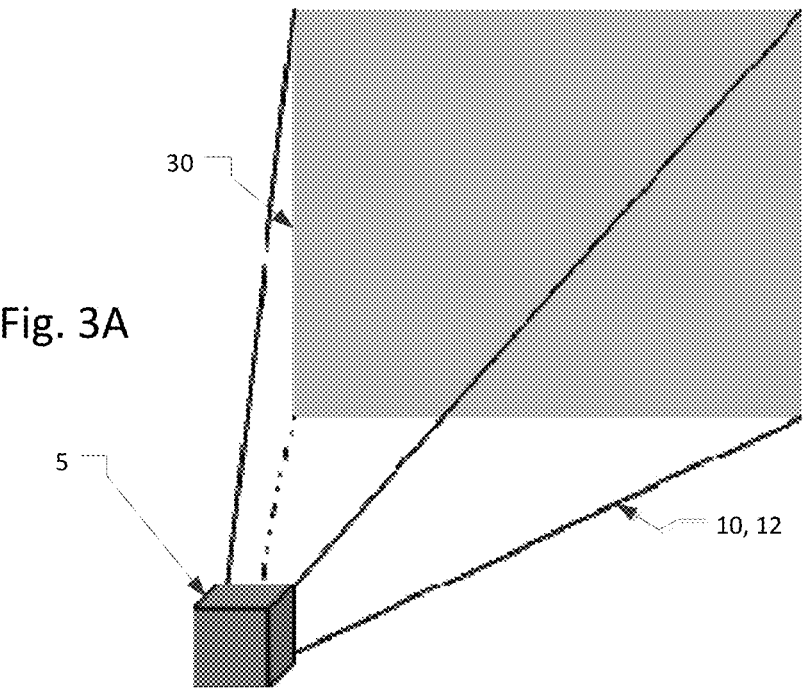
FIGS. 3A and 3B are schematic diagrams illustrating rear and side views showing conventional illumination that covers the entire field of view of the imaging sensor of the camera.
Figure 3B:
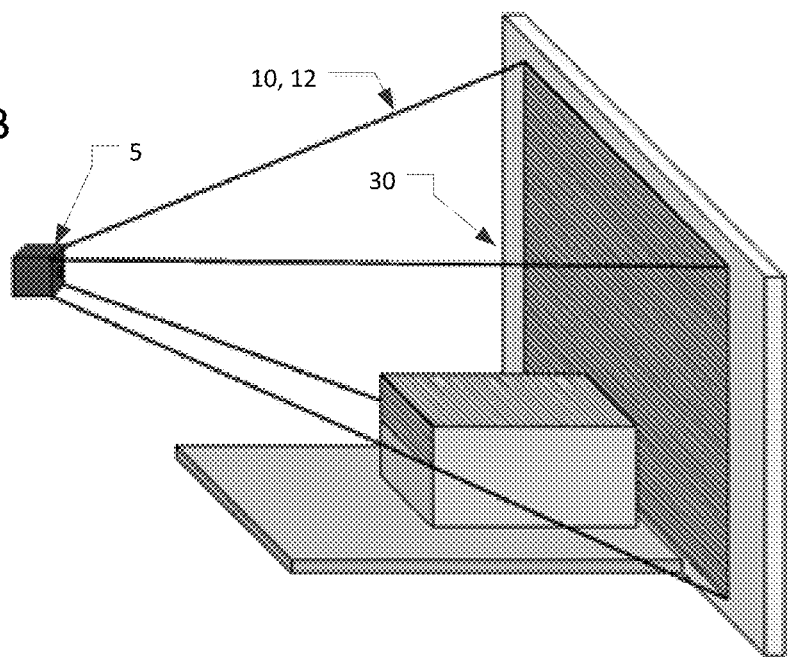

FIGS. 3A and 3B illustrate the illumination strategy used by conventional TOF cameras. Specifically, the TOF camera 5 illuminates the entire field of view/scene 30 with the illumination light 11. The impinging light signal 10 from the camera's field of view is the light that is collected and imaged onto the imaging sensor 90 of the TOF camera 5.

Furthermore, by illuminating the full field-of-view simultaneously the illumination light power is shared between all pixels 100 of the imaging sensor 90. In high background light conditions, e.g. sun light, the low signal power per pixel results in a low ratio of modulated light power to background light power for every pixel.

The timing of typical 3D TOF cameras includes integration and readout of the pixel field. Since in most systems, not all required samples can be stored within one integration, different exposures have to be performed to generate enough samples to derive depth.

As illustrated in FIGS. 4A-4E, in a first embodiment, the illumination light 12 is formed into a horizontal stripe 410 that is projected onto the scene 30 that defines the camera's field of view. The stripe 410 is scanned from bottom to top over time to thereby sequentially scan over the camera's field of view as illustrated by the successive time intervals. The pixel region corresponding to the illuminated stripe is at least one horizontal line, but preferably several lines. In any case, the pixel regions or portions of the field of view that are illuminated (illuminated stripe) are preferably a small part of the total pixels/total field of view of the camera 5, such as 10% or less.

Figures 4A, 4B, 4C, 4D, 4E:
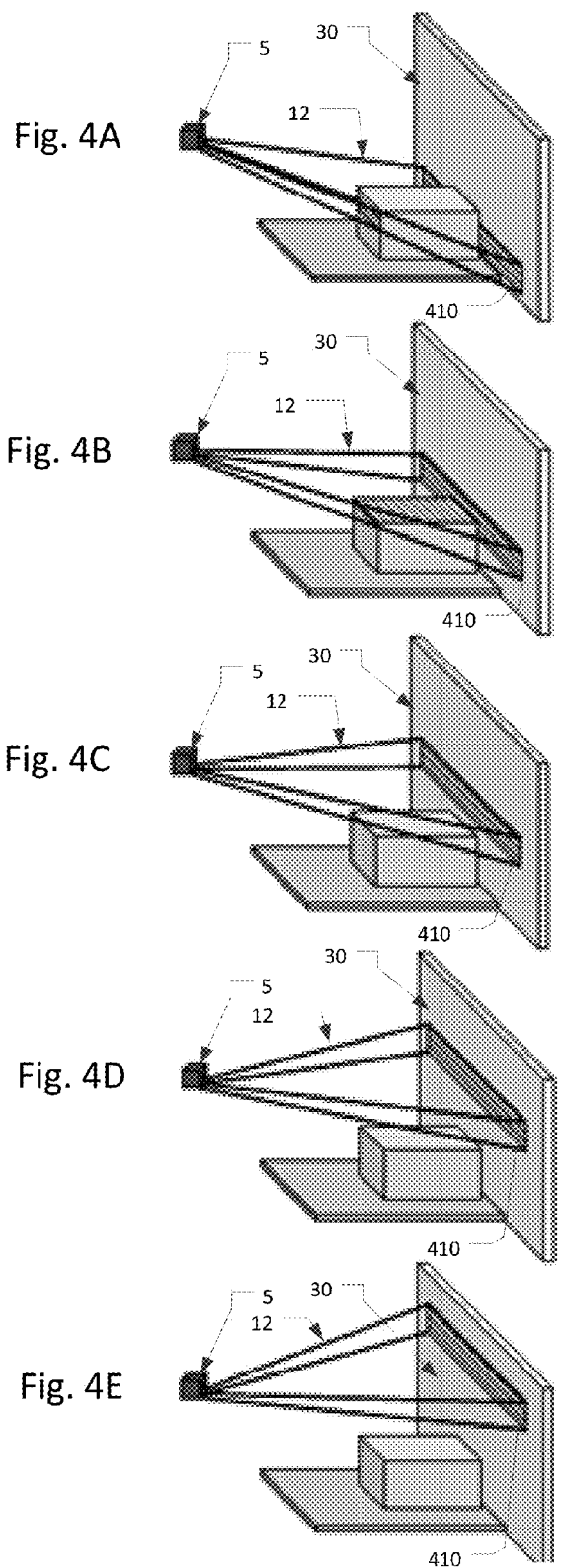
FIGS. 4A-4E are schematic side view diagrams illustrating the sequential illumination of the field of view of the imaging sensor by the illumination module according to the present invention.

In a first acquisition, shown in FIG. 4A, the illumination light 12 is projected onto the scene. When imaged on the imaging sensor of the camera 5, it corresponds to at least one line of pixels at the bottom of the field-of-view. Ideally, the stripe illumination exactly illuminates the pixel region.

After the data of the first pixel region is acquired, the illumination light stripe 410 moves to its second position and illuminates a second pixel region as show in FIG. 4B. The data of the second pixel region is acquired.

This procedure is repeated and the stripe 410 of illumination light 12 moves from pixel region to pixel region, over the field of view of the camera 5, until the full image is acquired.

All image pixel regions can finally be combined together to generate a full 3D image by the image processor 70.

The pixel regions are preferably adjacent and together cover the field of view of the camera 5.

For better robustness of the system 5, the different pixel regions acquired overlap each other. Amplitude and offset values of the pixel values acquired for different pixel region measurement are used by the image processor 70 to select or weight the depth measurement.

The stripe-shape illumination projections 410 of the different acquisitions might also overlap each other.

During the acquisition of any pixel region, the illumination is preferably not moving. However, in high speed acquisition modes, the stripe might continuously move while acquiring data.

The pixel region can also be scanned from top to bottom, or, in case of a vertical stripe illumination from left to right, right to left respectively.

Figure 5:
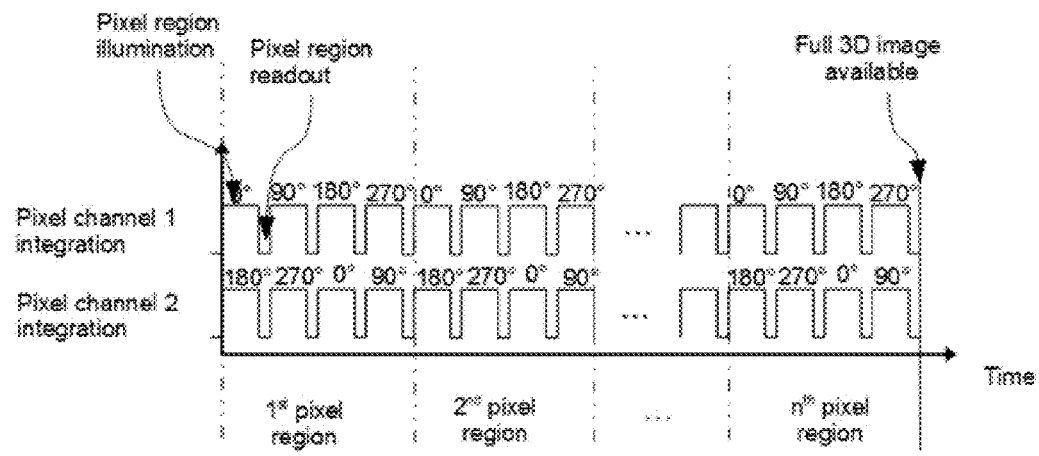
FIG. 5 is a timing diagram of the different samples and the corresponding pixel region according to an embodiment of the invention.

FIG. 5 is a timing diagram illustrating the sampling performed in the pixel channel integration sites for the pixels 100 of the imaging sensor 90. In more detail, each of the pixels 90 has at least two integration sites. During the first time, the first pixel region is illuminated, followed by the second pixel region until all of the pixel regions within the imaging sensor 100 have been illuminated.

Up to four or even more acquisitions are often performed with a TOF pixel. Based on the most widely spread TOF pixels containing two storage sites, four exposures are generally used for the depth calculation. In one example, the samples required for a depth measurement on a pixel region are acquired before projecting the illumination to the next pixel region.

In the example, the integration (illumination) is always followed by the pixel readout. In principle, the readout of pixel region i can be done in parallel to integrating in pixel region i+1 (with i=1 . . . n−1, where n defines the total number of pixel regions).

Figure 6:
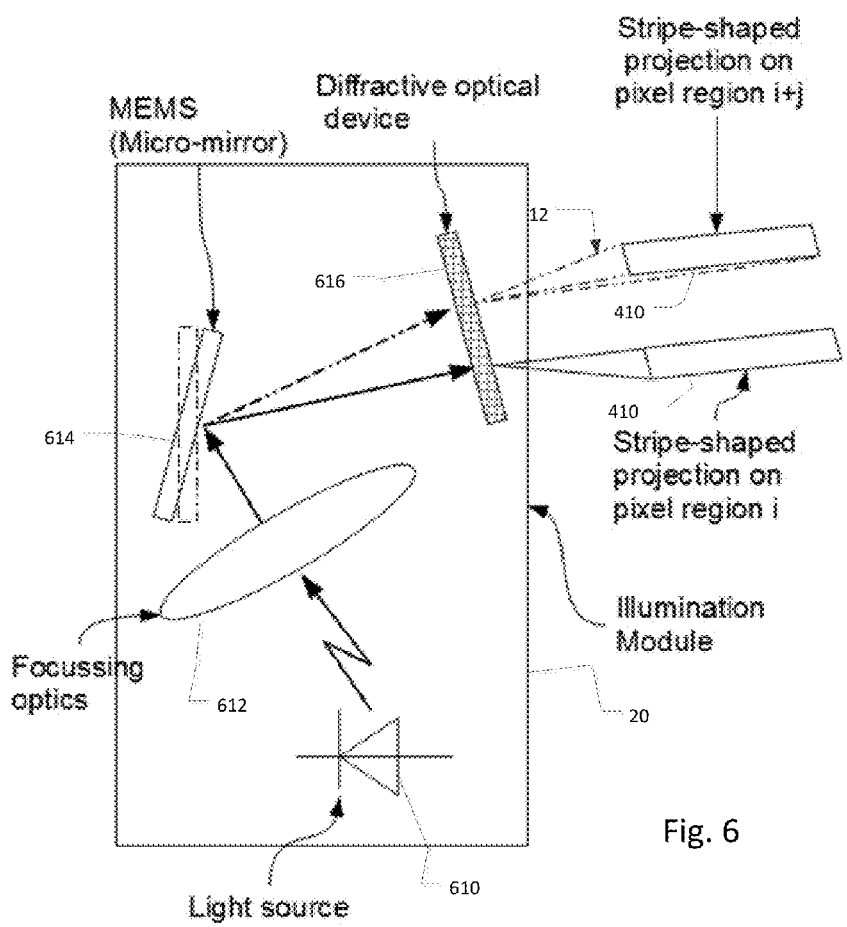
FIG. 6 is a schematic diagram illustrating one embodiment of the illumination module.

FIG. 6 shows an embodiment of the illumination module 20 that provides for the scanning of the illumination light 11 so that it is projected onto the different pixel regions using a micro-mirror device.

The light source 610 is preferably one or more laser diodes or LEDs. The scanning is performed using scanning device such as micro-mirror 614. However, polygon scanners, piezo-electric micro-prism elements or even galvanometers are also imaginable. Focusing optics 612 are used to collect the light from the light source 610 and project it onto the mirror 614.

The illumination module 20 (scanning device 614 and the modulation of the light source 610) needs to be synchronized with the imaging sensor 90 by the control unit 60. This can be either done by controlling the sensing and the illumination by the same controller. Other approaches might sense the position of the scanning device and based on the position adjust the sensing control.

The diffractive optical device 616 forms the desired shape of the illuminated area, e.g. a stripe shape.

It is also possible to operate the whole scanning system in a kind of "slave" mode by controlling the speed of the micro-mirror by an external signal. This external signal might be synchronized with any application-specific signal. For example in conveyor applications the external signal may be derived by the speed of the conveyor itself assuming the speed can be monitored by the overall system. If an object on the conveyor needs to be measured in 3D, no artifacts due to motion are expected because the scanner moves the illuminated region synchronously with the object speed while a certain pixel region of interest is illuminated.

Figure 7:
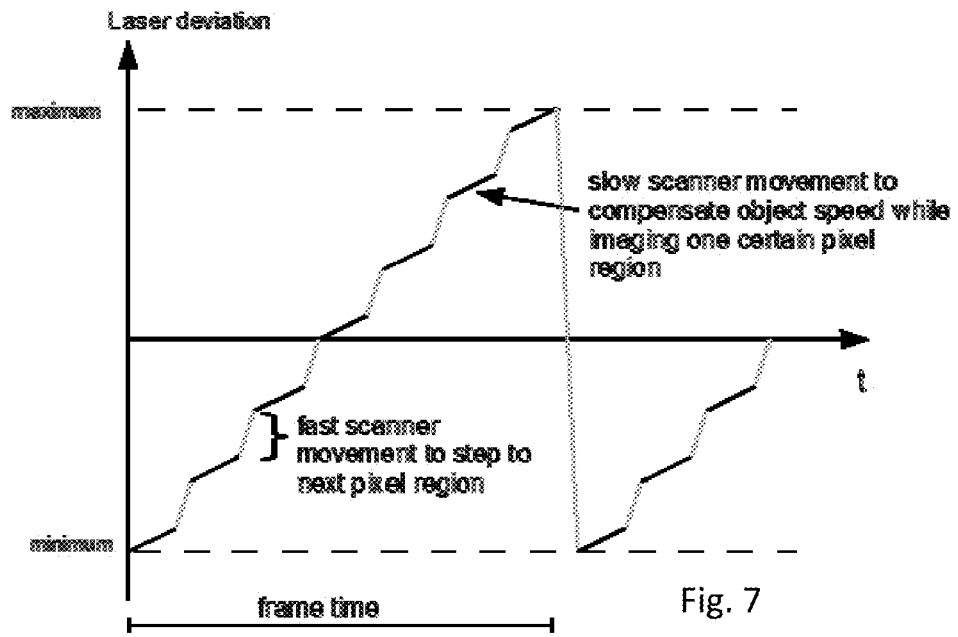
FIG. 7 is a plot of the scanning of the illumination light by external control where a slow movement during the illumination of a certain pixel region is synchronized with the object speed to reduce motion-induced artifacts due to the object movement.

An example for the micro-mirror deviation over time controlled from external and based on the object speed in order to compensate for object speed, is shown in FIG. 7. The slow movement during the illumination of one certain pixel region compensates for the object speed. The fast movement steps the illuminated region to the next pixel region. The figure also demonstrates the generic flexibility of controlling the micro-mirror movement.

Being able to control the minimum and maximum deviation of the illuminated line enables the dynamic adjustment of the illuminated area to the object's region of interest that is going to be imaged. While in today's time-of-flight camera systems a smaller region of interest can only be defined for the sensor readout while in any case the illuminated region stays at maximum size, the scanning approach enables the optimal illumination of only that area, which is of interest, by squeezing the light deviation accordingly. Thus, squeezing the region of interest of imaged area is getting possible without wasting any light due to the illumination of some areas that are lying outside of the region of interest.

In one embodiment, the optical axis of the imaging sensor and the central scanning axis defined by the scanning mirror and optical train of the illumination module are identical. There are drawbacks associated with this configuration arising from the fact that the light projection needs to go through the imaging lens, however. Due to scattering light and design restrictions, this approach is technically challenging. Therefore, illumination opening or aperture of the illumination unit 20 is preferably placed as close to the axis of the optical imaging lens 40 as possible.

Figures 8A, 8B, 8C:
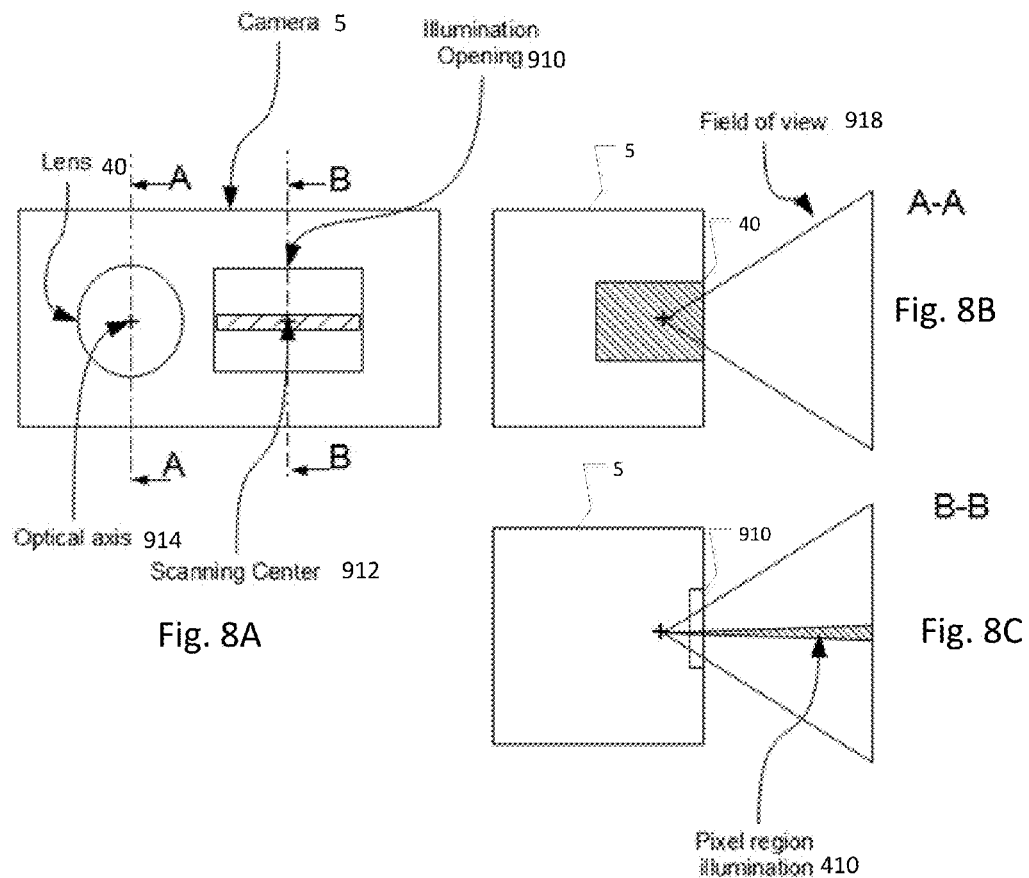
FIGS. 8A, 8B, and 8C schematically show a front view, camera cross section through the lens, and camera cross section through the illumination module, shown for the case of a horizontal stripe system arrangement.

As shown in FIGS. 8A-8C, in the case of a horizontal stripe illumination, the optical axis 914 of the imaging lens system 40, the center point of rotation of the scanning device 614 (e.g. MEMS micro-mirror) and the central line projection should all lie in the same horizontal plane.

This has the advantage, that although the projecting illumination and the optical axis are displaced horizontally, each pixel region always corresponds to the same projecting illumination position, independent on the distance of the target.

The according setup with a vertical alignment of the illumination and the lens system is preferred in case of a vertical stripe illumination.

In case of a displacement of the projecting stripe and the corresponding imaging pixel region, the displacement can be detected by checking the measured signal values. If there is a complete misalignment, the measured signal tends ideally to zero, and in reality the noise level determines the lowest measurable signal.

It is imaginable to redefine the pixel region to any projecting stripe by checking signal values on the fly. During calibration, the signal can be used to define pixel regions and corresponding projection directions.

While this invention has been particularly shown and described with references to preferred embodiments thereof, it will be understood by those skilled in the art that various changes in form and details may be made therein without departing from the scope of the invention encompassed by the appended claims.

What is claimed is:

1. A time of flight camera comprising:
   an imaging sensor including a two-dimensional array of pixels that demodulates received light from a two dimensional field of view of a scene; and
   an illumination module arranged for illuminating, sequentially, respective portions of the field of view of the scene with modulated light, wherein each illuminated portion of the field of view corresponds to a plurality of pixels of a horizontal line of the array and a plurality of pixels of a vertical column of the array, each illuminated portion corresponding to fewer than all of the pixels in the array, wherein different groups of pixels corresponding to respective ones of the illuminated portions partially overlap one another,
   wherein the time of flight camera further includes a processor operable to perform a depth calculation based on samples from the different groups of pixels corresponding to respective ones of the partially overlapping portions.

2. A camera as claimed in claim 1, wherein illuminated portions are scanned over the field of view.

3. A camera as claimed in claim 1, wherein the imaging sensor reads out pixels that correspond to the illuminated portions of the field of view.

4. A camera as claimed in claim 1, wherein the illuminated portions are stripe-shaped.

5. A camera as claimed in claim 1, wherein the illuminated portions are horizontal stripes.

6. A camera as claimed in claim 1, wherein the illuminated portions are horizontal stripes that are successively scanned over the entire field of view.

7. A camera as claimed in claim 1, wherein the illumination module comprises a light source and a scanning device for scanning the light from the light source over the field of view.

8. A camera as claimed in claim 7, wherein the scanning of the scanning device is synchronized to the acquisition by the imaging sensor.

9. A camera as claimed in claim 1, wherein the illuminated portions of the field of view are less than 10% of the total field of view.

10. A camera as claimed in claim 1, wherein scanning by the illumination module is controlled by an external signal source.

11. A camera as claimed in claim 1, wherein the imaging sensor acquires multiple samples with each of the pixels that correspond to the illuminated portions of the field of view.

12. A camera as claimed in claim 1 wherein the illumination module comprises a diffractive optical element arranged so that light exiting the illumination module corresponds to a respective one of the portions of the field of view.

13. A camera as claimed in claim 1 wherein the illumination module comprises:
   a light source;
   a micro-mirror operable to scan light form the light source across the entire field of view; and
   a diffractive optical element arranged to receive light reflected by the micro-mirror and to shape the light so that light exiting the illumination module corresponds to a respective one of the portions of the field of view.

14. A camera as claimed in claim 1 wherein each illuminated portion of the field of view corresponds to a plurality of horizontal lines or vertical columns of the array.

15. A method of operation for a time of flight camera, the method comprising:
   illuminating, sequentially, respective portions of a two dimensional field of view of a scene with modulated light, wherein each portion of the field of view corresponds to a plurality of pixels of a horizontal line of the array and a plurality of pixels of a vertical column of the array, each portion corresponding to fewer than all of the pixels in the array, wherein different groups of pixels corresponding to respective ones of the illuminated portions partially overlap one another; and
   using the two dimensional array of pixels to demodulate received light from the two dimensional field of view of the scene;
   acquiring multiple samples in each of the pixels that corresponds to the illuminated portions of the field of view, including the different groups of pixels corresponding to respective ones of the illuminated portions that partially overlap one another; and
   performing a depth calculation using the multiple samples from the pixels corresponding to the illuminated portions of the field of view, including the different groups of pixels corresponding to respective ones of the illuminated portions that partially overlap one another.

16. A method as claimed in claim 15, further comprising sequentially illuminating different portions of the field of view.

17. A method as claimed in claim 15, further comprising reading out pixels of an imaging sensor that correspond to the illuminated portions of the field of view.

18. A method as claimed in claim 15, wherein the illuminated portions are stripe-shaped.

19. A method as claimed in claim 15, wherein the illuminated portions are horizontal stripes.

20. A method as claimed in claim 15, wherein the illuminated portions are horizontal stripes that are successively scanned over the entire field of view.

21. A method as claimed in claim 15, wherein illuminating portions of the field of view comprises generating light with a light source and then scanning the light over the field of view with a scanning device.

22. A method as claimed in claim 21, further comprising synchronizing the scanning of the scanning device with acquisition of light from the scene by an imaging sensor.

23. A method as claimed in claim 15 wherein each portion of the field of view corresponds to a plurality of horizontal lines or vertical columns of the array.

\* \* \* \* \*